United States Patent [19]
Jewell et al.

[11] Patent Number: 5,497,281
[45] Date of Patent: Mar. 5, 1996

[54] EXPANDED TUBULAR HUB DISK PACK ASSEMBLY CLAMP

[75] Inventors: Robert W. Jewell; Gary M. Peter, both of Boise, Id.

[73] Assignee: Hewlett-Packard Company, Palo Alto, Calif.

[21] Appl. No.: 331,770

[22] Filed: Oct. 31, 1994

[51] Int. Cl.⁶ .................................................. G11B 17/08
[52] U.S. Cl. ..................... 360/98.08; 360/99.12
[58] Field of Search ............................. 360/98.08, 99.12; 369/270

[56] References Cited

U.S. PATENT DOCUMENTS

| | | | |
|---|---|---|---|
| 4,683,505 | 7/1987 | Schmidt et al. | 360/98.08 X |
| 4,791,624 | 12/1988 | Stinesen | 369/270 |
| 4,918,545 | 4/1990 | Scheffel | 360/98.08 |
| 5,006,942 | 4/1991 | Brooks et al. | 360/98.08 |
| 5,101,306 | 3/1992 | Johnson | 360/98.08 |
| 5,367,418 | 11/1994 | Chessman et al. | 360/99.12 |

*Primary Examiner*—John H. Wolff
*Attorney, Agent, or Firm*—E. F. Oberheim

[57] ABSTRACT

A disk pack is clamped between an external flange adjacent one end of a hub and a ring clamp adjacent the other end of the hub. The hub terminates in a tubular section at the location of the ring clamp. The tubular section has substantially cylindrical internal and external surfaces. The ring clamp has a central opening defined by a wall in the ring clamp. The wall of the central opening of the ring clamp is a sliding fit over the substantially cylindrical external surface of the tubular section of the hub. The periphery of a circular expander wedge has an interference fit engagement within the substantially cylindrical internal surface of the tubular hub section. When the circular expander wedge is in place in the tubular section of the hub the tubular section is expanded. The substantially cylindrical external surface of the tubular section is compressed against the wall of the central opening of the ring clamp. The radial pressure or force is maintained by the presence of the circular expander wedge which, in the best mode for practicing the invention, remains in place. The radial pressure is uniformly circumferentially distributed around the circular wedge and is correspondingly uniformly applied to the ring clamp to frictionally secure the ring clamp to the hub.

10 Claims, 3 Drawing Sheets

5,497,281

EXPANDED TUBULAR HUB DISK PACK ASSEMBLY CLAMP

TECHNICAL FIELD

This invention relates to hard disk drives and in particular to a hard disk pack assembly in which a disk pack is clamped to a hub employing a disk pack clamp which is frictionally secured to the hub.

BACKGROUND OF THE INVENTION

Prior art disk pack assemblies conventionally include a hub and a disk pack of one or more disks secured to the hub. The disk pack is clamped between an external flange at one end of the hub and a clamp at the other end of the hub. One or more screws are employed to secure the clamp to the hub and to bias the clamp to apply critical axial pressure to the disk pack. Usually the disks of the disk pack are separated by spacer rings in a stack clamped between the external flange on the hub and the clamp. Where the disks are of a brittle material, such as glass or a ceramic material, axial compliance in the stack is provided to obviate disk fracture as clamping pressure varies in the presence of environmental thermal cycling.

Conventional screw attachments of the clamp to the hub require extreme care in assembly to achieve the correct clamping pressure and to achieve uniformity of circumferential clamping pressure, if disk warpage is to be avoided.

One method to eliminate screw attachments comprises the use of a shrink ring, either as part of the clamp or as a separate ring to secure the clamp axially to the hub with the disk pack under clamping pressure. This shrink ring process, while effective, is intricate and requires a significant process development and support effort, necessitating a carefully controlled heating temperature, delicate handling of the heated ring to avoid physical damage and uneven cooling, and swift transition from the heater to precise placement and clamping force at installation.

SUMMARY OF THE INVENTION

A disk pack is clamped between an external flange adjacent one end of a hub and a ring clamp adjacent the other end of the hub. The hub terminates in a tubular section at the location of the ring clamp. The tubular section has substantially cylindrical internal and external surfaces. The ring clamp has a central opening defined by a wall in the ring clamp. The wall of the central opening of the ring clamp is a sliding fit over the substantially cylindrical external surface of the tubular section of the hub. The periphery of a circular expander wedge has an interference fit engagement within the substantially cylindrical internal surface of the tubular hub section. When the circular expander wedge is in place in the tubular section of the hub the tubular section is expanded. The substantially cylindrical external surface of the tubular section is compressed against the wall of the central opening of the ring clamp. The radial pressure or force is maintained by the presence of the circular expander wedge which, in the best mode for practicing the invention, remains in place. The radial pressure is uniformly circumferentially distributed around the circular wedge and is correspondingly uniformly applied to the ring clamp to frictionally secure the ring clamp to the hub.

Assembly is easily accomplished by supporting the hub against axial movement and applying uniformly circumferentially distributed axial pressure to the ring clamp to securely clamp the disks in the disk stack. Then the circular expander wedge is pressed into the tubular section, expanding the exterior surface of the tubular section and compressing it against the wall of the central opening of the ring clamp, securing the assembly.

While an interference fit may be obtained between the circular expander wedge and a cylindrical interior surface of the tubular section of the hub, it is preferred to provide a slope to the inner surface of the tubular section, sloping from a larger diameter at the open end of the tubular section to a lesser diameter in an axial direction toward the flange of the hub. The slope angle is chosen to provide a self locking angle with respect to the direction of the radial force of the installed circular expander wedge.

The diameter of the opening into the tubular section and the diameter of the circular expander wedge are selected to permit easy entrance of the circular expander wedge into the tubular section. The necessary expansion of the tubular section occurs with penetration of the circular expander wedge into the tubular section along the sloping surface, the sloping surface being essentially a section of a cone. Self locking at the line or area of contact between the peripheral edge of the circular expander wedge and the sloping interior surface of the tubular section retains the circular expander wedge in place.

Since the circular expander wedge applies a uniformly distributed radial force to the tubular section, which, in turn applies a uniform pressure to the wall of the central opening in the ring clamp, there are no unequal axial clamp forces coupled to the disks to warp the disks. This is indispensable in meeting increasing data capacity requirements in disk drives, necessitating lower flying heights of the read/write heads.

Threads in the hub and screws securing the clamp are eliminated, reducing the number of parts, the parts inventory and assembly complexity, all of which reduce cost.

Screw clamp parts take up precious volume. Eliminating such parts increases the mechanical volumetric efficiency.

Eliminating the need to heat the clamp ring or a ring to retain the clamp ring, as required in the shrink ring assembly, referred to above, eliminates assembly operations which are failure prone and reduces assembly complexity.

BRIEF DESCRIPTION OF THE DRAWINGS

This invention will be better understood by reference to the following specification when considered in conjunction with the accompanying drawings, in which.

DESCRIPTION OF THE PREFERRED EMBODIMENTS

Figure 1A:
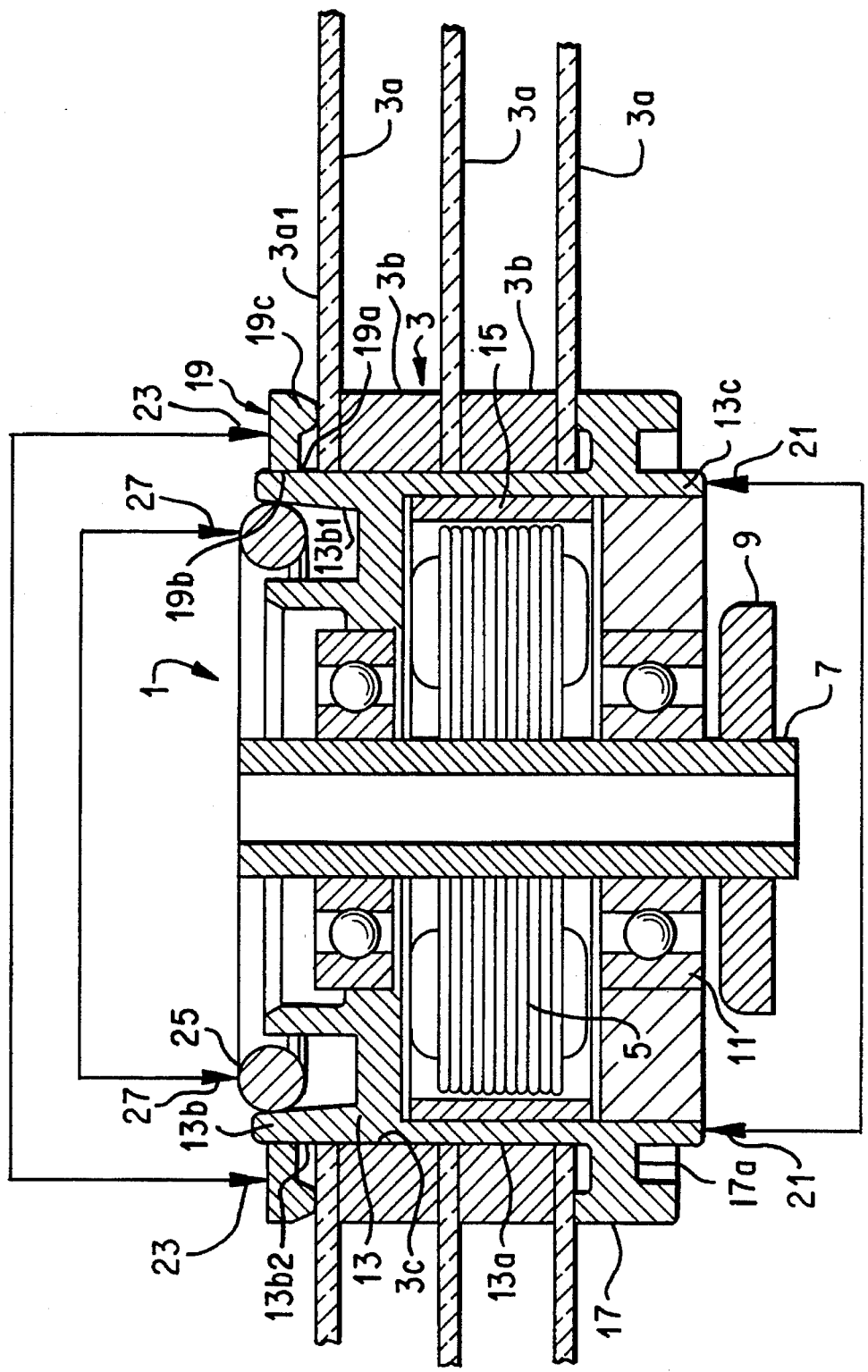
FIG. 1A is a cross sectional view of a disk pack assembly, embodying a disk clamp structure according to this invention, in which the disks and the disk spacer rings in the disk pack are compressed in the clamp structure.
Figure 1B:
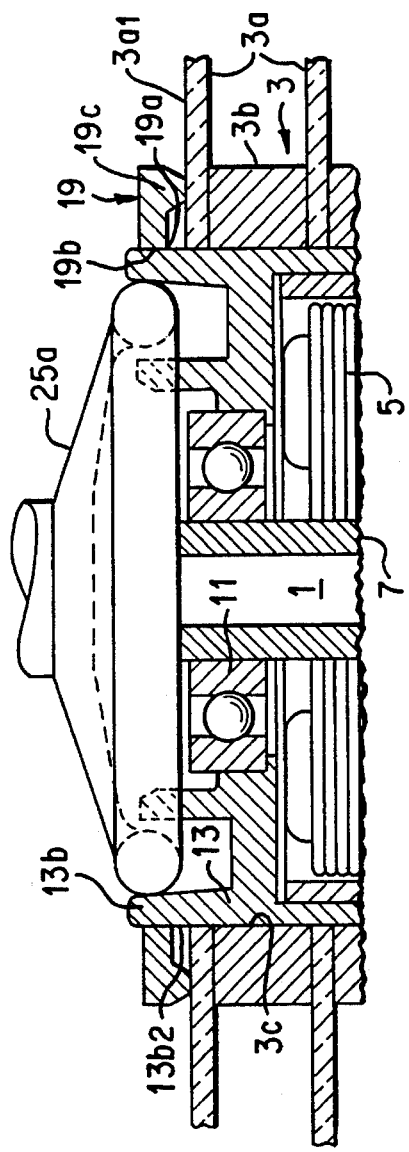
FIG. 1B is a fragmentary illustration of a modification of FIG. 1A.

FIG. 1 illustrates a disk pack assembly in which a disk motor 1 is located within a disk pack 3. The disk motor 1 comprises a stator 5 secured to a spindle 7 which is secured in a base 9. A coaxial bearing pair 11 mounted to the spindle 7 journal a motor rotor 13 for rotation about the stator 5. The disk motor 1 is a conventional brushless radial gap motor in which the motor rotor 13 comprises a radially spot magnetized permanent magnet ring 15. The motor 1 rotates the disk assembly 3 at a selected constant speed. The motor rotor 13 is of steel and functions as the flux return path for the permanent magnet ring 15.

The disk pack 3 is mounted to a hub, which in this case is the motor rotor 13. For this purpose, the motor rotor 13 has a cylindrical outer surface 13a and is provided with an external flange 17 at one end having a reduced web section 17a for the purpose of providing a degree of axial compliance. In this illustration, the disk pack 3 comprises three disks 3a spaced apart by two spacer rings 3b. In practice, the disk pack 3 may comprise one or more disks 3a. The disk pack 3 has a central opening 3c which is a sliding fit over the cylindrical outer surface 13a of the motor rotor 13, the bottom disk 3a of the disk pack 3 seating upon the flange 17. The upper end, as viewed, of the motor rotor 13 terminates in an open ended tubular section 13b projecting above the upper surface of the upper disk 3a in the disk pack 3.

A ring clamp 19 has a central opening 19a defined by a circular wall 19b and a circumferential depending clamp portion 19c. The wall 19b of the central opening 19a of the ring clamp 19 slips over the tubular section 13b of the motor rotor 13, seating the circumferential depending clamp portion 19c upon the upper surface 3a1 of the upper disk 3a of the disk pack 3.

To secure the ring clamp 19 to the tubular section 13b of the motor rotor 13, the bottom end 13c of the motor rotor 13 is supported against axial movement, as indicated by the arrows 21. Clamping force is now applied to the ring clamp 19, in a direction axially of the motor rotor 13, as indicated by the arrows 23. Preferably this clamping force is uniformly distributed circumferentially of the ring clamp 19 in that degree to assure secure compression clamping of the disk pack 3 between the flange 17 and the ring clamp 19.

With the assembly of the motor 1 and disk pack 3 supported and clamped as described, a circular wedge member 25 is pressed into the open end of the tubular section 13b. The arrows 27 indicate the direction of the force application, which is directed axially of the motor rotor 13.

The tubular section 13b has a substantially cylindrical interior surface 13b1. The interior surface 13b1 may be a cylindrical interior surface, in which case the circular wedge member 25 is provided with a slightly larger diameter than the diameter of the cylindrical interior surface 13b1 to provide an interference fit therewith and to expand the tubular section sufficiently to achieve compressive engagement of the cylindrical exterior surface 13b2 of the tubular section with the wall 19b of the central opening 19a in the ring clamp 19.

Preferably, however, the substantially cylindrical interior surface 13b1 defines a section of a cone, the surface of the conical section tapering from a diameter at the open end of the tubular section 13b, which is as large or larger than the diameter of the circular wedge member 25, to a smaller diameter within the tubular section 13b. The slope of the surface of the conical section is selected to provide a self locking engagement between the circular periphery of the circular wedge member 25 and the surface of the conical section. Forced insertion of the circular wedge member 25 into the tubular section 13b expands the tubular section 13b as a function of the depth of insertion, displacing the cylindrical exterior surface of the tubular section into compressive engagement with the wall 19b of the ring clamp 19 to secure the clamp to the motor rotor 13. The force of engagement is uniformly distributed about the ring clamp 19.

The circular wedge member 25, according to the best mode for practicing this invention, is preferably of metal and is shaped as a toroid the body 25a of which is of circular cross section. The circular wedge member 25 preferably remains in place after insertion. The circular wedge member 25 may be configured other than as a toroid. All that is required is a circular body having a circumferential edge which is curved or arcuate in a plane normal to the plane of the circular body. This provides annular line contact with the interior surface 13b1 of the tubular section 13b.

The circular wedge member 25 may be part of a swaging tool 25a, as seen in FIG. 1 A, in which case it is removed from the tubular section 13b after the swaging operation is completed. In this case, the thickness of the wall of the tubular section 13b is of sufficient thickness to maintain the required force of compressive engagement between the exterior surface 13b2 of the tubular section 13b and the wall 19b of the central opening 19a of the ring clamp 19.

Figure 2:
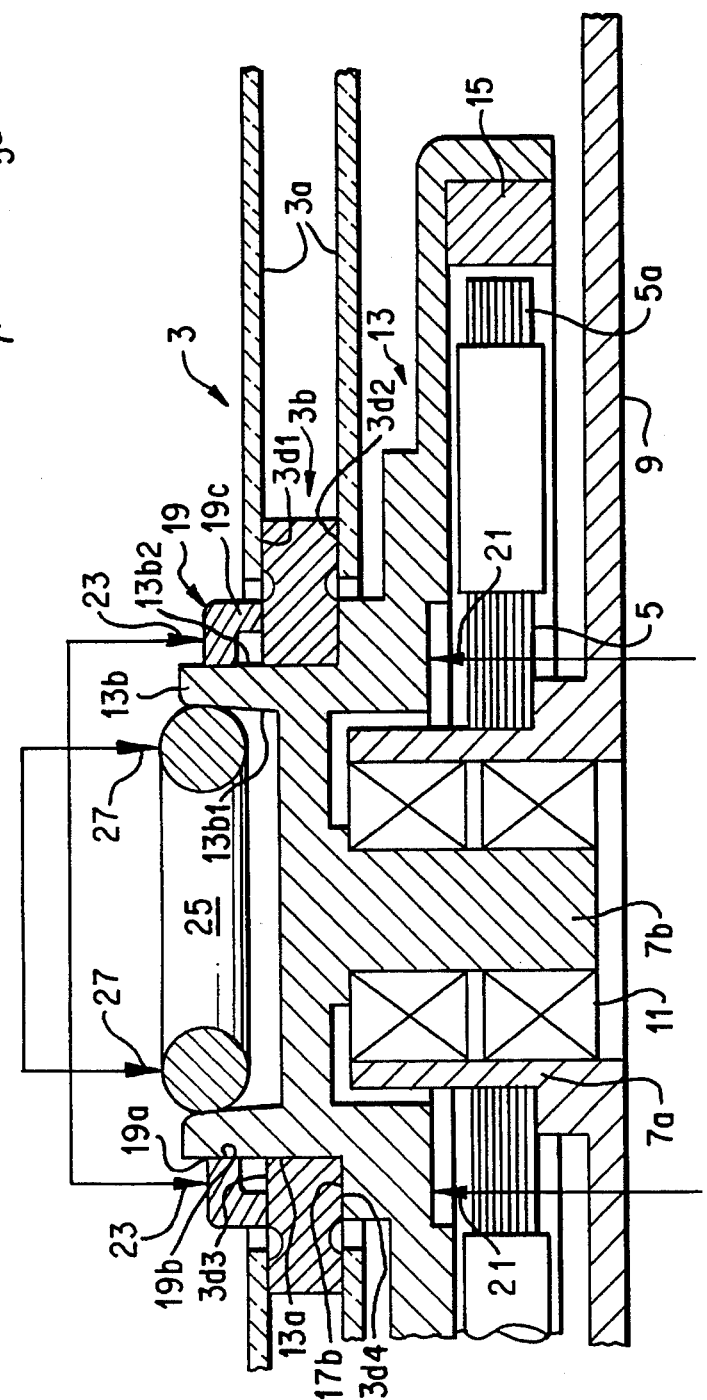
FIG. 2 is a cross sectional view of a disk pack assembly, embodying a disk clamp according to this invention, in which only the disk spacer or support ring of one or two disks in the disk pack, is compressed in the clamp structure.

In FIG. 2, parts corresponding to those of FIG. 1 have like reference characters.

FIG. 2 illustrates the application of this invention to a disk drive in which only the spacer ring 3b of the disk pack 3 is clamped to the motor rotor 13. In this arrangement, the disk pack 3 is not assembled on the motor rotor as in FIG. 1. Instead, the disk pack is assembled separately, the disks being bonded to the opposite axial surfaces 3d1, 3d2, of the disk spacer ring 3b, leaving exposed the inner, annular, axial clamping surfaces 3d3 and 3d4.

The motor rotor 13 approximates an umbrella shape and mounts a permanent magnet ring 15 which forms a radial gap with respective salient poles of a stator 5. The motor rotor 13 has an annular axial surface forming a shoulder 17b and a cylindrical body which has a cylindrical external surface 13a for mounting the disk pack 3, the cylindrical body terminating in a tubular section 13b. The bottom annular axial clamping surface 3d4 seats upon the shoulder 17b of the motor rotor 13. The circumferential depending clamp portion 19c of the ring clamp 19 is seated upon the annular axial clamping surface 3d3 of the spacer ring 3b. Clamping pressure is applied, as indicated by the arrows 21 and 23, to secure the spacer ring 3b of the disk pack 3 to the motor rotor 13. This part of the disk pack assembly process is accomplished before the motor is assembled to permit access to the motor rotor support points at the location of the arrows 21. The forced insertion of the circular expander wedge 25 into the tubular section 13b expands the tubular section, compressing the cylindrical external surface 13a against the wall 19b of the central opening 19a of the ring clamp 19, which secures the ring clamp 19 to the tubular section 13b of the motor rotor 13, securing the disk pack assembly.

Figure 3:
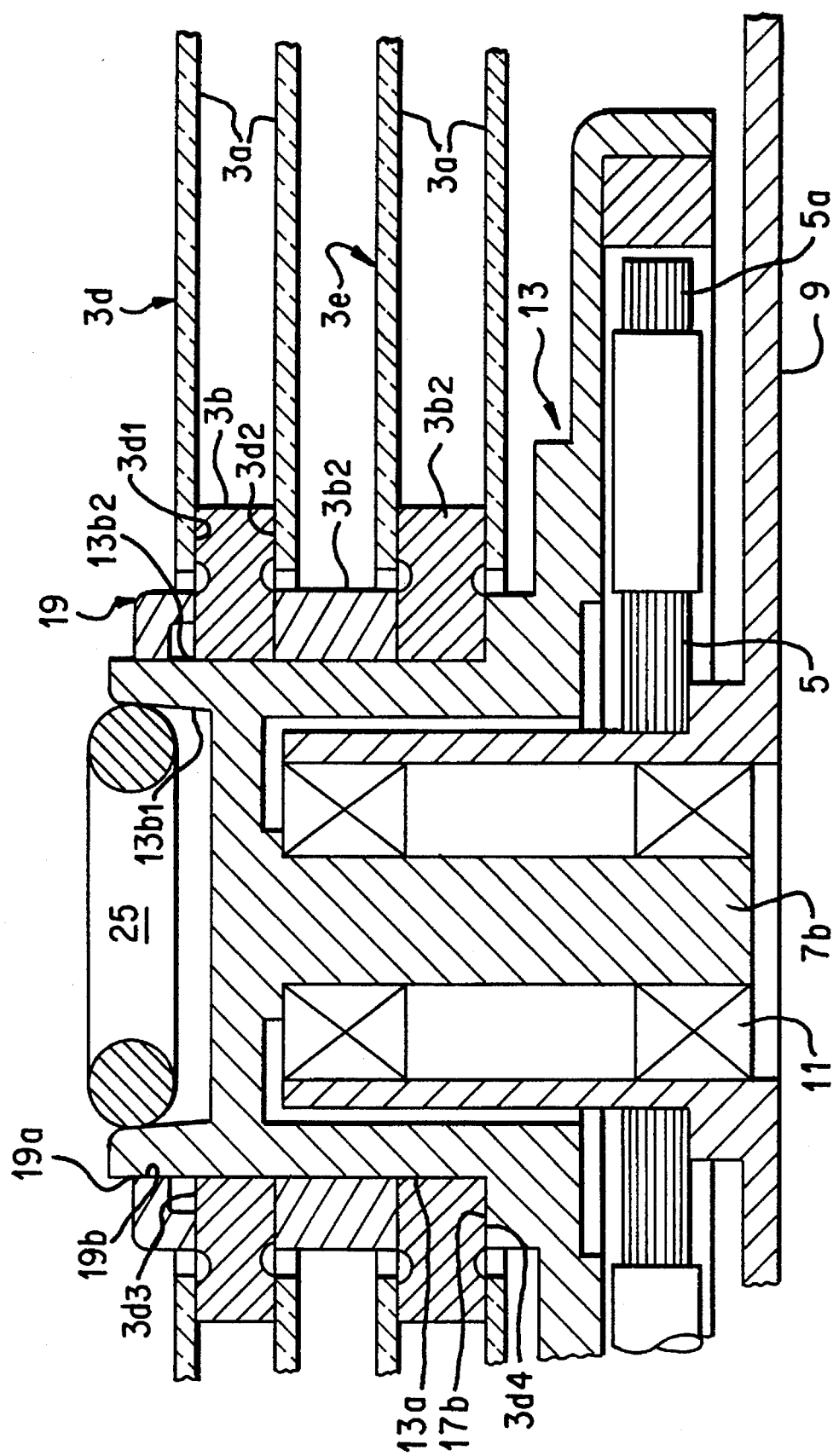
FIG. 3 is a cross sectional view of a disk pack assembly, embodying a disk clamp according to this invention, in which only the disk spacer rings of three or more disks in the disk pack are compressed in the clamp structure.

FIG. 3 illustrates a further embodiment of this invention in which two disk packs, 3d, 3e, of the type of disk pack 3 of FIG. 2, are stacked with a spacer ring 3b2 therebetween on the shoulder 17b of the motor rotor 13. The circumferential depending clamp portion 19c of the ring clamp 19 seats upon the annular axial clamping surface 3d3 of the upper disk pack 3e in the disk pack stack. The ring clamp 19 is again secured to the motor rotor 13 at the tubular section 13b by insertion of the circular expander wedge 25 into the tubular section 13b.

While the invention has been described in terms of a disk pack assembly including the rotor of a motor, it will be appreciated that the invention may be practiced employing a hub, such as a tubular hub, having an external flange or shoulder at one end upon which the disk pack is seated and clamped by the ring clamp at the other end of the tubular hub. Such a separate disk pack assembly is usually adhesively bonded to a disk motor rotor or shaft.

The invention may be modified as to its details without departing from the spirit and scope of its teachings.

What is claimed is:

1. A disk pack assembly, comprising:
   a. a hub having axially spaced opposite ends;
   b. an external flange on said hub adjacent one end of said opposite ends;
   c. a flexible tubular section on said hub axially spaced from said one end of said opposite ends of said hub, said tubular section having a substantially cylindrical exterior surface and a substantially cylindrical interior surface;
   d. a disk pack comprising at least one disk, said disk pack having a central opening receiving said hub and having opposite annular axial surfaces around said central opening, one annular axial surface of said opposite annular axial surfaces seated on said external flange;
   e. a flexible ring clamp having an opening therethrough defined by a wall of said ring clamp, said ring clamp being disposed about said hub at said substantially cylindrical exterior surface, said ring clamp having a circumferential clamp portion seated upon and pressing against the other annular axial surface of said opposite annular axial surfaces of said disk pack, and
   f. means for applying a circumferentially distributed radial force against said substantially cylindrical interior surface of said tubular section for radially expanding said tubular section and compressing said substantially cylindrical exterior surface of said tubular section against said wall of said ring clamp, to frictionally secure said ring clamp to said hub.

2. The disk pack assembly according to claim 1, in which:
   a. said means for applying a circumferentially distributed radial force comprises a circular wedge member having a circular periphery in interference fit engagement with said substantially cylindrical interior surface of said tubular section for radially expanding said tubular section.

3. The disk pack assembly according to claim 2, in which:
   a. said substantially cylindrical interior surface of said tubular section comprises a sloping surface having a slope from a larger diameter at one interior axial location in said tubular section of said hub to a smaller diameter in said tubular section in an axial direction toward said one end of said hub, for receiving said circular periphery of said circular wedge member and having an interference fit engagement therewith for radially expanding said tubular section, the slope of said sloping surface providing self locking frictional engagement between said sloping surface and said circular periphery of said circular wedge member.

4. The disk pack assembly according to claim 2, in which:
   a. said circular wedge member comprises a ring shaped body of circular planform and of substantially circular cross section.

5. The disk pack assembly according to claim 1, in which:
   a. said tubular section of said hub is at the other end of said opposite ends of said hub.

6. The disk pack assembly according to claim 1, in which:
   a. said tubular section is at the other end of said opposite ends of said hub, said tubular section having an open end at said other end of said hub, and
   b. said means for applying a circumferentially distributed radial force comprises a ring shaped body of circular planform and of substantially circular cross section, said ring shaped body having a peripheral interference fit in said tubular section for radially expanding said tubular section.

7. The disk pack assembly according to claim 1, in which:
   a. said at least one disk of said disk pack is disposed on said hub between said flange and said ring clamp.

8. The disk pack assembly according to claim 7, in which:
   a. said hub comprises part of a motor rotor.

9. The disk pack assembly according to claim 1, in which:
   a. said disk pack comprises a spacer ring to which said at least one disk is mounted, said spacer ring having opposite inner annular axial clamping surfaces, said spacer ring being clamped on said hub with said inner annular axial clamping surfaces clamped, respectively, to said external flange and to said circumferential clamp portion of said ring clamp.

10. The disk pack assembly according to claim 9, in which:
    a. said hub comprises a tube having said external flange adjacent said one end.

* * * * *